United States Patent [19]

Reeve et al.

[11] 4,452,506

[45] Jun. 5, 1984

[54] COUPLING OF DIELECTRIC OPTICAL WAVEGUIDES

[75] Inventors: Michael H. Reeve, Ipswich; Colin A. Millar, Stowmarket; David B. Payne, Wickham Market, all of England

[73] Assignee: Post Office, London, England

[21] Appl. No.: 211,049

[22] Filed: Nov. 28, 1980

[30] Foreign Application Priority Data

Dec. 3, 1979 [GB] United Kingdom ............... 7941618

[51] Int. Cl.³ .............................................. G02B 7/26
[52] U.S. Cl. ............................. 350/96.20; 250/227; 350/96.15
[58] Field of Search ............ 350/96.15, 96.16, 96.17, 350/96.20, 96.21; 356/400; 250/227, 561

[56] References Cited

U.S. PATENT DOCUMENTS

| | | | |
|---|---|---|---|
| 3,593,026 | 7/1971 | Uchida et al. | 250/227 X |
| 3,938,895 | 2/1976 | Bridger et al. | 356/152 |
| 4,188,087 | 2/1980 | D'Auria et al. | 350/96.20 |
| 4,303,302 | 12/1981 | Ramsey et al. | 350/96.20 |
| 4,329,659 | 5/1982 | Chen | 350/96.15 X |

FOREIGN PATENT DOCUMENTS 2626839 12/1977 Fed. Rep. of Germany .

OTHER PUBLICATIONS

Althammer, "Fully Automatic System for the Coupling Alignment of Optical Fibres," *Optical and Quantum Electronics*, vol. 9, 1977, pp. 393–397.

*Primary Examiner*—John D. Lee
*Attorney, Agent, or Firm*—Cushman, Darby & Cushman

[57] ABSTRACT

A pair of optical fibres which are to be joined are located with their end portions in coupling elements one of which is transparent to light. The coupling elements are located such that the ends of the fibres are in approximate alignment. Light is transmitted along one fibre so that it is received by the fibre in the transparent coupling element. Light which is not coupled into the core of the fibre is sensed by a sensor and the relative position of the fibres is adjusted until the level of sensed light is a minimum. The sensing of the light is carried out at positions spaced angularly about the waveguide so that an indication of the direction of any misalignment is obtained. The coupling elements are then secured in this position. The adjustment of the fibres can be carried out using a linear translation stage and a microprocessor which controls the stage in accordance with signals from the sensor.

10 Claims, 4 Drawing Figures

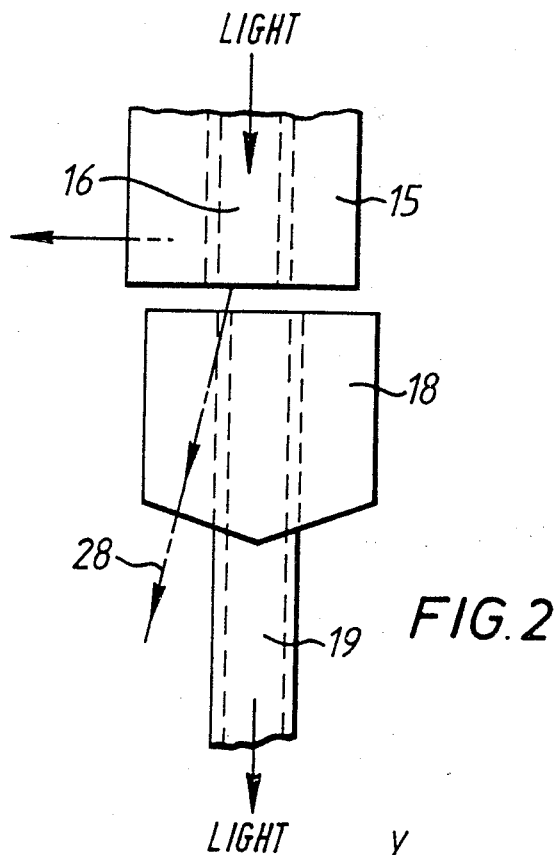
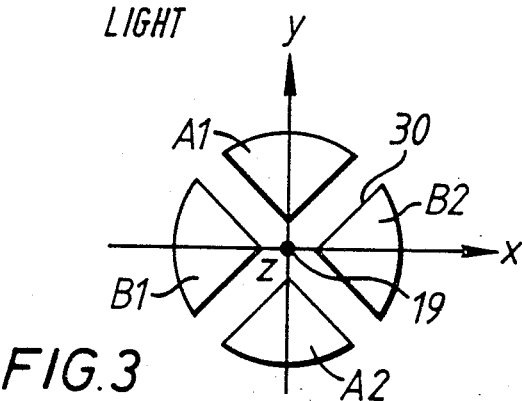
FIG.2
FIG.3

COUPLING OF DIELECTRIC OPTICAL WAVEGUIDES

DESCRIPTION

This invention relates to the coupling of dielectric optical waveguides.

Dielectric optical waveguides in the form of optical fibres usually comprise a core region which is surrounded by a cladding. Light transmission occurs along the core. The majority of known optical fibre couplers use the cladding surface of the optical fibres to align the fibre cores. Generally the couplers operate by attempting to accurately align the claddings of each fibre by referencing them to a common external element. Such a technique does not necessarily result in the cores of the two fibres being in exact alignment which should be the prime aim in an optical fibre connection, particularly when monomode fibres are being coupled.

The present invention proposes a coupling technique which results in the cores of two fibres in a fibre joint being aligned. In the present technique two fibres are aligned approximately, light is transmitted along one of the fibres, light which is not coupled into the core of the other fibre is detected and the relative position of the fibres is adjusted until the detected light is a minimum.

In this specification the term "light" is intended to mean that part of the electro-magnetic spectrum known as the visible region together with those parts at each end of the visible region which can be transmitted by dielectric optical waveguides.

According to one aspect of the present invention there is provided a method of coupling dielectric optical waveguides which comprises locating each optical waveguide in a coupling element, at least one of said coupling elements being transparent to light, locating said elements such that the waveguides are in approximate axial alignment, transmitting light along one of said waveguides so that it is received by the waveguide in a transparent coupling element, sensing the light which is not coupled into the core of said receiving waveguide at positions spaced angularly about that waveguide to provide an indication of the direction of any misalignment of said waveguides, adjusting the relative position of said waveguides until the level of sensed light is a minimum, and securing the coupling elements in that position.

Apparatus for carrying out the method comprises first mounting means for mounting a first dielectric optical waveguide in a first coupling element, second mounting means for mounting a second dielectric optical waveguide in a second coupling element such that it is approximately aligned axially with the first waveguide, one of said mounting means being movable relative to the other along perpendicular axes in a plane perpendicular to the axis of the other mounting means, sensing means for sensing light not coupled into one waveguide when it is transmitted from the other waveguide, said sensing means being capable of sensing light at positions spaced angularly about the waveguide to provide an indication of the direction of any misalignment of said waveguides and means operative in response to signals from said sensing means to cause the position of said movable mounting means to move along one or other of said perpendicular axes.

The movable mounting means may include a linear translation stage which is movable by stepping motors.

The sensing means may comprise a quadrature diode. The quadrature diode may have four outputs which are connected in pairs to two differential amplifiers, the output from each amplifier being fed to a microprocessor which is arranged to produce signals for actuating said stepping motors to cause the stepping motors to move said translation stage such that the diode output reduces to a minimum.

The invention will be described now by way of example only with particular reference to the accompanying drawings. In the drawings:

FIG. 2 is a detailed view of part of the apparatus of FIG. 1;

FIG. 3 illustrates the operation of the present apparatus, and

Figure 1:
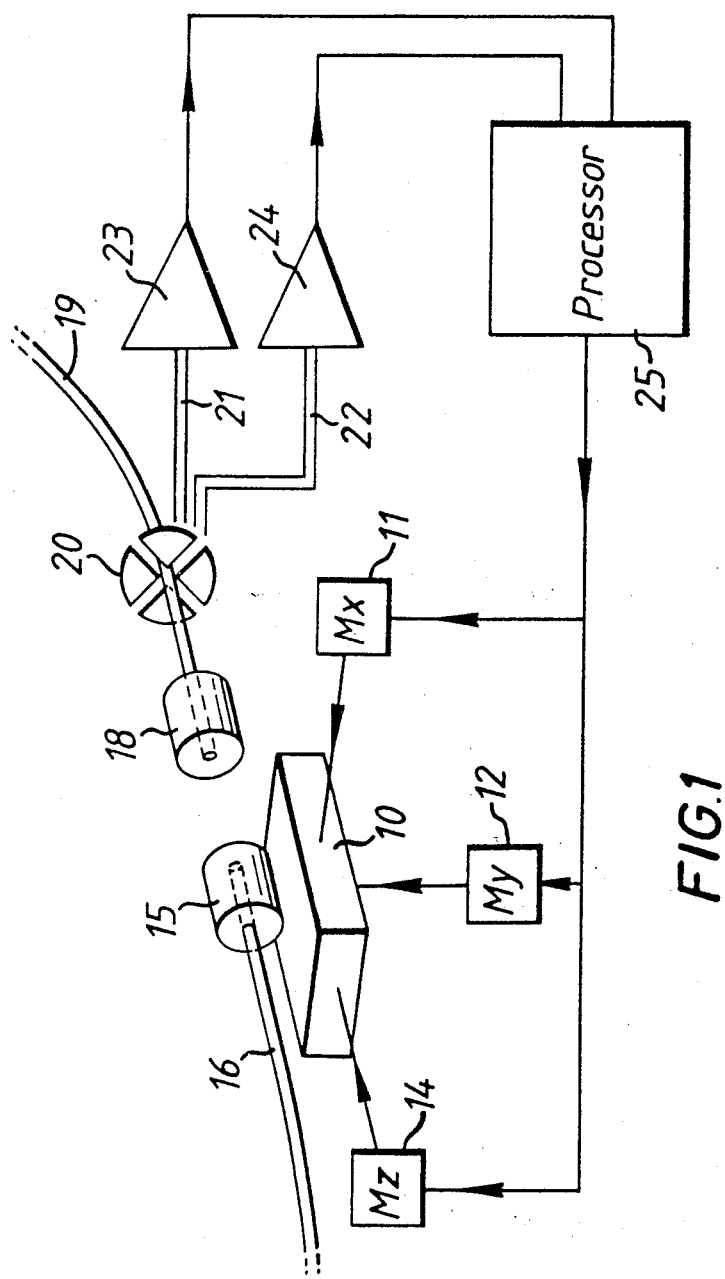
FIG. 1 is a schematic illustration of apparatus for carrying out the present technique.

Referring to FIG. 1 apparatus for coupling dielectric optical waveguides includes a linear translation stage 10 which is movable along X, Y and Z axes by stepping motors 11, 12 and 14. The translation stage supports a coupling element 15 for an optical fibre 16. The coupling element is a generally cylindrical ferrule with a central bore for receiving the optical fibre. A similar coupling element 18 is mounted substantially coaxially with the coupling element 15 in a suitable mounting means not shown. The coupling element 18 has a central bore for receiving an optical fibre 19. A quadrature diode 20 is disposed around the fibre 19 at a position spaced axially from the coupling element 18. The quadrature diode 20 has outputs 21, 22 which couple opposite pairs of quadrants to a respective amplifier 23, 24. The amplifiers 23 and 24 have outputs to a microprocessor 25 which in turn has an output to each of the motors 11, 12 and 14.

In operation the ends of the two optical fibres to be coupled are prepared in a conventional manner and located in respective coupling elements 15, 18. Light is transmitted along the fibre 16 and is received by the fibre 19. Light which is not coupled into the core of the fibre 19 is sensed by the quadrature diode 20 which generates outputs on lines 21, 22. These outputs are amplified by amplifiers 23 and 24 and fed to the microprocessor 25.

Referring to FIG. 3 one differential amplifier receives the outputs from quadrants A1 and A2 and the other from quadrants B1 and B2. The outputs from the differential amplifiers represent not only the degree of misalignment but also the direction. For example in FIG. 3 if the quandrant detectors are viewed from a downstream side, and if $A1-A2<0$ then the fibre 16 should be moved upwardly and vice versa. If $B1-B2<0$ then the fibre 16 should be moved to the left and vice versa.

The microprocessor 25 interprets the outputs from the amplifiers as described above and produces signals to actuate the stepping motors 11, 12 and 14 in such a manner that the coupling element 15 on the stage 10 is moved relative to the coupling element 18 such that the output from the diode 20 reduces to a minimum. When the diode is detecting no or substantially no light optimum coupling has been achieved. A bonding material is then used to bond the two coupling elements 15 and 18 in that position. During the bonding process the processor 25 continues to monitor the state of the joint.

A more detailed view of the two coupling elements is shown in FIG. 2. The coupling element 18 which is made of perspex or plastics is transparent so that light can pass therethrough to the diode 20. Preferably the optically transparent coupling element 18 should have a higher refractive index than the cladding of the fibre. The optical contact between the cladding and the ferrule must be good to ensure that the majority of the untrapped light refracts into the ferrule. The end of the ferrule 18 facing the diode may be angled as shown in FIG. 2 such that the radiated light emerges into space without further refraction, i.e. the light is striking that face substantially perpendicularly.

The diode array as shown in FIG. 3 has a slot 30 therein to allow removal of the fibre 19 after a joint has been formed. Alternatively the fibre 19 may be bent away from the diodes between the ferrule 18 and the diode array.

Figure 4:
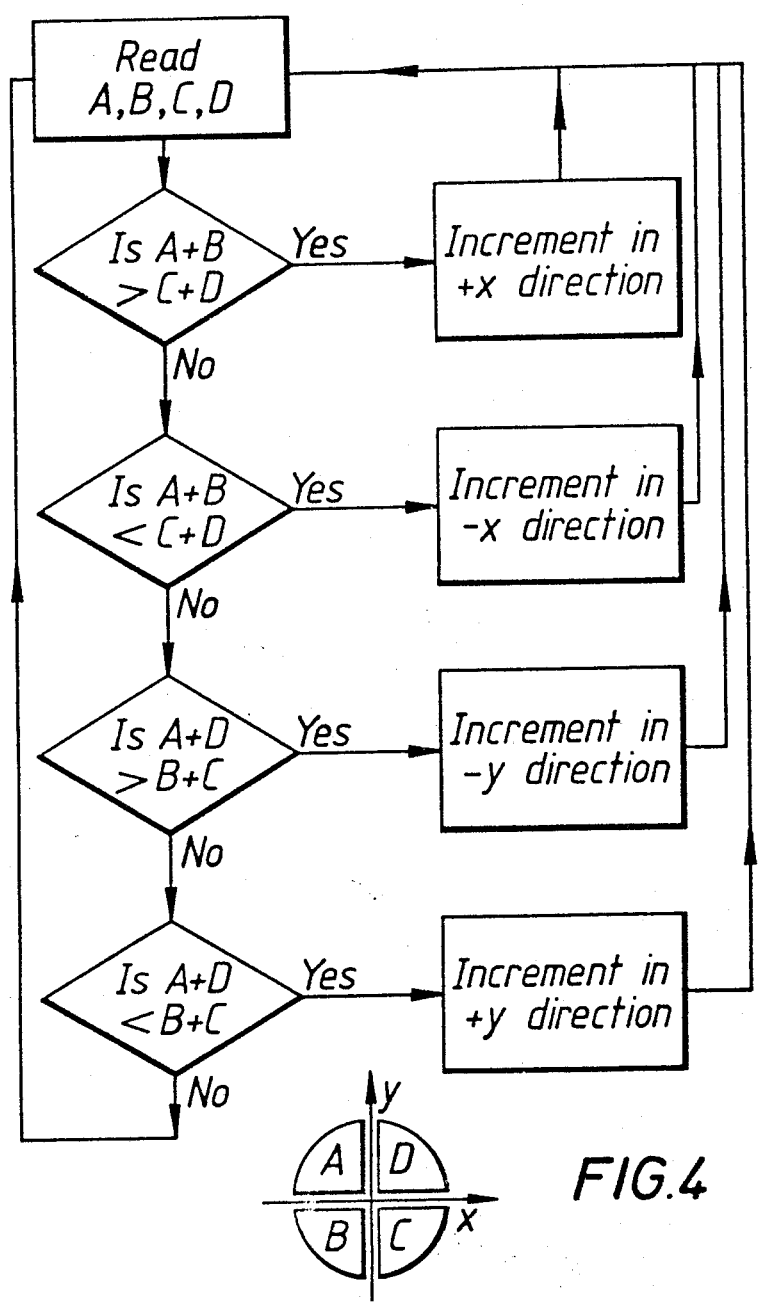
FIG. 4 is a flow chart forming the basis of a program for the microprocessor.

The programming of the microprocessor to carry out the functions described is a relatively straight forward matter. FIG. 4 is a flowchart giving the basis of a program for the microprocessor for an exemplary case where the x, y motion adjustment axes are rotated by 45° from that shown in FIGS. 1-3.

It has been found that the present arrangement is sensitive enough to give an alignment resolution of 0.2 $\mu$m when piezoelectric transducers are used with the motor driven stages to give fine positional control. As the light which is not coupled into the core of the fibre 19 is sensed at angularly spaced positions around that fibre, the present technique gives not only the degree but also an indication of the direction of any misalignment. The coupling technique is particularly suitable for coupling monomode fibres where alignment tolerances are critical.

We claim:

1. A method of coupling a pair of dielectric optical waveguides which comprises:
   locating each optical waveguide in a coupling element, at least one of said coupling elements being transparent to light,
   locating said elements such that the waveguides are in approximate axial alignment,
   transmitting light along one of said waveguides so that it is received by the waveguide in a transparent coupling element,
   independently sensing the light which is not coupled into the core of said receiving waveguide at plural positions spaced angularly about that waveguide to provide an indication of the relative direction of any misalignment of said waveguides,
   adjusting the relative position of said waveguides in a direction opposite the indicated relative direction of misalignment until the level of sensed light is a minimum, and
   securing the coupling elements to each other in that adjusted position.

2. Apparatus for carrying out the method of claim 1 comprising:
   first mounting means for mounting a first dielectric optical waveguide in a first coupling element,
   second mounting means for mounting a second dielectric optical waveguide in a second coupling element such that it is approximately aligned axially with the first waveguide,
   at least one of said mounting means being movable relative to the other along perpendicular axes in a plane perpendicular to the axis of the other mounting means,
   plural sensing means for sensing light not coupled into one waveguide when it is transmitted from the other waveguide, said sensing means being capable of independently sensing light at plural positions spaced angularly about the waveguide to provide respective independent indication signals having relative features which represent the relative direction of any misalignment of said waveguides and
   means automatically operative in response to said indication signals from said sensing means to cause the position of said movable mounting means to move along one or other of said perpendicular axes so as to minimize the light not coupled into said one waveguide.

3. Apparatus as claimed in claim 2 wherein the movable mounting means includes a linear translation stage which is movable by plural stepping motors.

4. Apparatus as claimed in claim 3 wherein the plural sensing means comprises a quadrature diode.

5. Apparatus as claimed in claim 4 wherein the quadrature diode has four outputs which are connected in pairs to two differential amplifiers, the output from each amplifier being fed to a microprocessor which is arranged to produce control signals for actuating said stepping motors so as to cause the stepping motors to move said translation stage such that the diode output reduces to a minimum.

6. A method of coupling a pair of dielectric optical waveguides, said method comprising:
   initially locating one end of each of said pair of waveguides within respective coupling elements such that these waveguide ends are approximately aligned;
   transmitting light along a first one of said waveguides such that it is passed across said approximately aligned ends to the second one of said waveguides;
   independently sensing light emitted from said first waveguide but not coupled into said second waveguide at first and second positions spaced apart about said second waveguide;
   comparing the relative magnitude of light sensed at said first and second positions to obtain an indication of the relative direction of any misalignment between said waveguide ends; and
   adjusting the relative position of said waveguides in accordance with the indicated direction of misalignment so as to minimize the non-coupled light sensed at said first and second positions.

7. A method as in claim 6 wherein said sensing, comparing and adjusting steps are repeated for third and fourth sensing positions which thus define a second relative direction of misalignment located at a substantially right angle with respect to the first-mentioned direction.

8. A method as in claim 6 or 7 further comprising the step of fixedly securing said coupling elements to each other after the final adjusting step.

9. Apparatus for coupling a pair of dielectric optical waveguides, said apparatus comprising:
   means for initially locating one end of each of said pair of waveguides within respective coupling elements such that these waveguide ends are approximately aligned;
   means for transmitting light along a first one of said waveguides such that it is passed across said approximately aligned ends to the second one of said waveguides;

means for independently sensing light emitted from said first waveguide but not coupled into said second waveguide at first and second positions spaced apart about said second waveguide;

means for comparing the relative magnitude of light sensed at said first and second positions to obtain an indication of the relative direction of any misalignment between said waveguide ends; and means for automatically adjusting the relative position of said waveguides in accordance with the indicated direction of misalignment so as to minimize the non-coupled light sensed at said first and second positions.

10. Apparatus as in claim 9 wherein second said sensing, comparing and adjusting means are included for third and fourth sensing positions which thus define a second relative direction of automatically minimized misalignment located at a substantially right angle with respect to the first-mentioned direction.

* * * * *